US012585226B2

(12) United States Patent
Yasuda

(10) Patent No.: US 12,585,226 B2
(45) Date of Patent: Mar. 24, 2026

(54) EXTERIOR MEMBER, CASE AND TIMEPIECE

(71) Applicant: CASIO COMPUTER CO., LTD., Tokyo (JP)

(72) Inventor: Takumi Yasuda, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 764 days.

(21) Appl. No.: 17/880,921

(22) Filed: Aug. 4, 2022

(65) Prior Publication Data

US 2022/0373975 A1 Nov. 24, 2022

Related U.S. Application Data

(62) Division of application No. 16/837,005, filed on Apr. 1, 2020, now Pat. No. 11,442,412.

(30) Foreign Application Priority Data

Apr. 1, 2019 (JP) ................................ 2019-070134

(51) Int. Cl.
*G04B 37/22* (2006.01)
*G04B 37/00* (2006.01)

(52) U.S. Cl.
CPC ....... *G04B 37/225* (2013.01); *G04B 37/0008* (2013.01)

(58) Field of Classification Search
CPC .......................... G04B 37/225; G04B 37/0008
See application file for complete search history.

(56) References Cited

U.S. PATENT DOCUMENTS

| | | | |
|---|---|---|---|
| 4,199,931 | A | 4/1980 | Yokoyama |
| 4,234,947 | A | 11/1980 | Matsumoto |
| 4,291,400 | A | 9/1981 | Komiyama et al. |
| 4,817,065 | A | 3/1989 | Usui et al. |

FOREIGN PATENT DOCUMENTS

| | | | |
|---|---|---|---|
| CN | 203732894 U | * | 7/2014 |
| JP | H07-244170 A | | 9/1995 |
| JP | 2000232284 A | | 8/2000 |

(Continued)

OTHER PUBLICATIONS

Translation of JP2005114495A, Kimura (Year: 2005).*

(Continued)

*Primary Examiner* — JaMel M Nelson
*Assistant Examiner* — Erica Hartsell Funk
(74) *Attorney, Agent, or Firm* — Scully, Scott, Murphy & Presser, P.C.

(57) ABSTRACT

An exterior member that is favorably manufactured, a case having the exterior member and a timepiece having the case are provided. The exterior member includes an exterior main body section in which a first resin layer is provided on one side of a sheet member formed of carbon fiber and a cutout recess section from which a portion of the sheet member is exposed is provided in the first resin layer on the one side of the sheet member, and a protection member which covers the cutout recess section of the first resin layer. Accordingly, the exterior member is favorably manufactured with its strength being increased.

7 Claims, 8 Drawing Sheets

(56) References Cited

FOREIGN PATENT DOCUMENTS

| | | | | |
|---|---|---|---|---|
| JP | 2005114495 | A | * | 4/2005 |
| JP | 2012-123136 | A | | 6/2012 |
| JP | 2012-135659 | A | | 7/2012 |
| JP | 2016-025634 | A | | 2/2016 |

OTHER PUBLICATIONS

Translation of CN203732894U, Nakatsuka (Year: 2014).*
Notification of the First Office Action dated Apr. 20, 2021 received in Chinese Patent Application No. CN 202010238898.1 together with an English language translation.
Office Action dated Jan. 19, 2022 received in U.S. Appl. No. 16/837,005.
Notice of Allowance dated May 4, 2022 received in U.S. Appl. No. 16/837,005.
Notice of Reasons for Refusal dated Dec. 13, 2022 received in Japanese Patent Application No. JP 2021-112300.

* cited by examiner

EXTERIOR MEMBER, CASE AND TIMEPIECE

CROSS-REFERENCE TO RELATED APPLICATION

This application is a divisional application of U.S. patent application Ser. No. 16/837,005 filed on Apr. 1, 2020, which is based upon and claims the benefit of priority from the prior Japanese Patent Application No. 2019-070134, filed Apr. 1, 2019, the entire contents of which are incorporated herein by reference.

BACKGROUND

1. Technical Field

The technical field relates to an exterior member, a case equipped with the exterior member and a timepiece equipped with the case.

2. Description of the Related Art

For example, Japanese Patent Application Laid-Open (Kokai) Publication No. 07-244170 discloses a wristwatch case having a structure where a ring-shaped connecting member is attached to the outer circumferential portion of a case main body, and an exterior member is attached to the outer circumferential portion of the case main body by this connecting member.

SUMMARY

One embodiment is an exterior member comprising: an exterior main body section having a sheet member and a first resin layer which is provided on one side of the sheet member and has a cutout recess section from which a portion of the sheet member is exposed; and a protection member which covers the cutout recess section of the first resin layer.

The above and further objects and novel features of one embodiment will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENT

A wristwatch according to an embodiment will hereinafter be descried with reference to FIG. 1 to FIG. 8B. Note that, in the descriptions thereof, the display side of the wristwatch is taken as an upper side and the opposite side is taken as a lower side.

Figure 1:
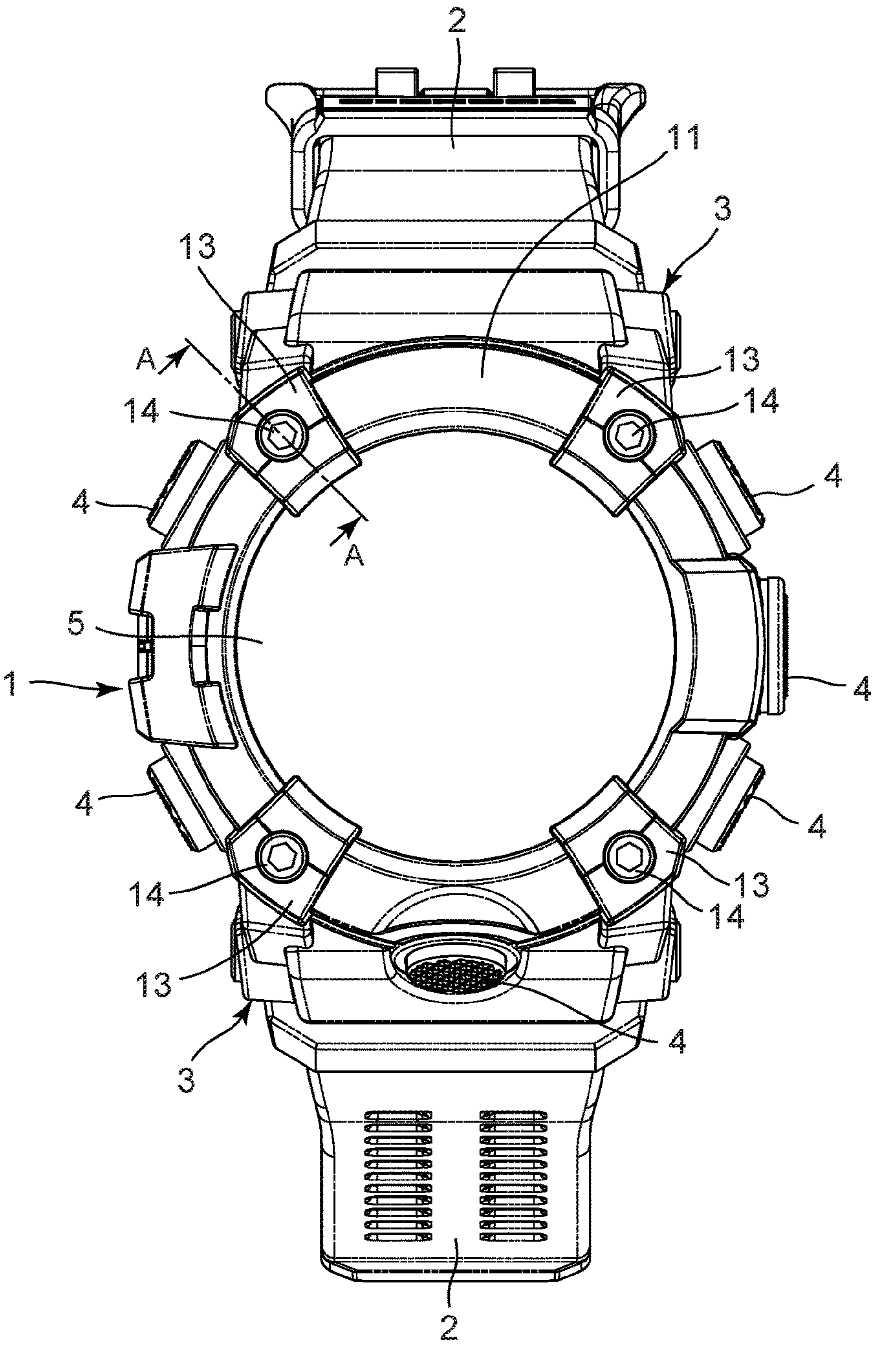
FIG. 1 is an enlarged front view of one embodiment.

This wristwatch has a wristwatch case 1 as shown in FIG. 1. On the twelve o'clock side and six o'clock side of the wristwatch case 1, band attachment sections 3 to which watch bands 2 are attached are provided. Also, on the two o'clock side, three o'clock side, four o'clock side, six o'clock side, eight o'clock side and ten o'clock side of the wristwatch case 1, push button switches 8 are provided, respectively.

Figure 2:
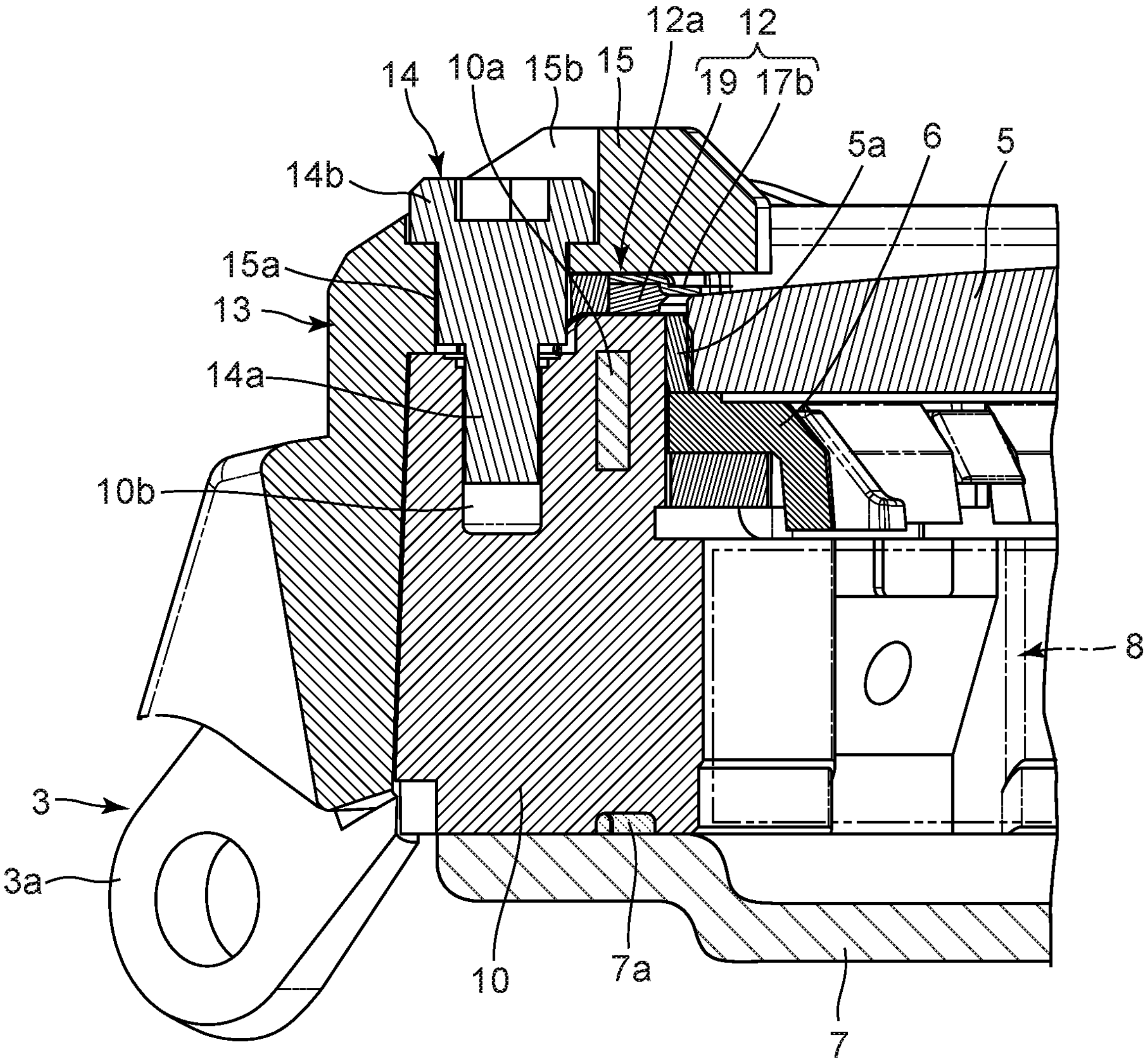
FIG. 2 is an enlarged sectional view of a main portion of a wristwatch taken along line A-A in FIG. 1.

To the upper opening of the wristwatch case 1, a watch glass 5 is attached via a packing 5*a*, as shown in FIG. 2. Also, in an inner area of the wristwatch case 1 under the watch glass 5, a parting member 6 is provided. To the bottom of the wristwatch case 1, a back cover 7 is attached via a waterproof ring 7*a*.

Inside the wristwatch case 1, a timepiece module 8 is provided, as shown in FIG. 2. This timepiece module 8 has various components which are not shown in the drawings but are necessary for timepiece functions, such as a timepiece movement for driving pointers, a display panel for displaying information including time information, and a circuit section for electrically driving these sections.

The wristwatch case 1 includes a case main body 10 and an exterior case 11, as shown in FIG. 1 and FIG. 2. The case main body 10 is made of a synthetic resin acquired by, for example, polyamide resin being mixed with glass fiber or carbon fiber, and has a metal reinforcement section 10*a* embedded therein. This case main body 10 is formed to be substantially cylindrical, and pairs of attachment projection sections 3*a* of the band attachment sections 3 are provided on the twelve o'clock side and six o'clock side of the outer circumference portion of this case main body 10.

In the present embodiment, the exterior case 11 is attached to the case main body 10 in a manner to cover the upper outer circumference of the case main body 10, as shown in FIG. 1 to FIG. 5B. This exterior case 11 includes an exterior main body section 12 formed in a substantially ring shape, and a plurality of protection members 13 provided on predetermined portions of the exterior main body section 12. The exterior main body section 12 covers the upper surface of the case main body 10 and the upper surface of the outer circumferential rim of the watch glass 5 while circumferentially covering the upper part of the case main body 10.

On the top surface of the exterior main body section 12, a plurality of cutout recess sections 12*a* are provided corresponding to the pairs of attachment projection sections 3*a* of the case main body 10, as shown in FIG. 1 to FIG. 4. On these cutout recess sections 12*a*, the plurality of protection members 13 are arranged.

In the present embodiment, these protection members 13 are arranged on four cutout recess sections 12*a* provided on the exterior main body section 12, as shown in FIG. 1 to FIG. 4. Each protection member 13 is made of a synthetic resin such as urethane resin, and buffers external impacts. Also, these protection members 13 are attached to the case main body 10 by a plurality of screw members 14, whereby the exterior main body section 12 is fixed to the case main body 10.

Figure 3:
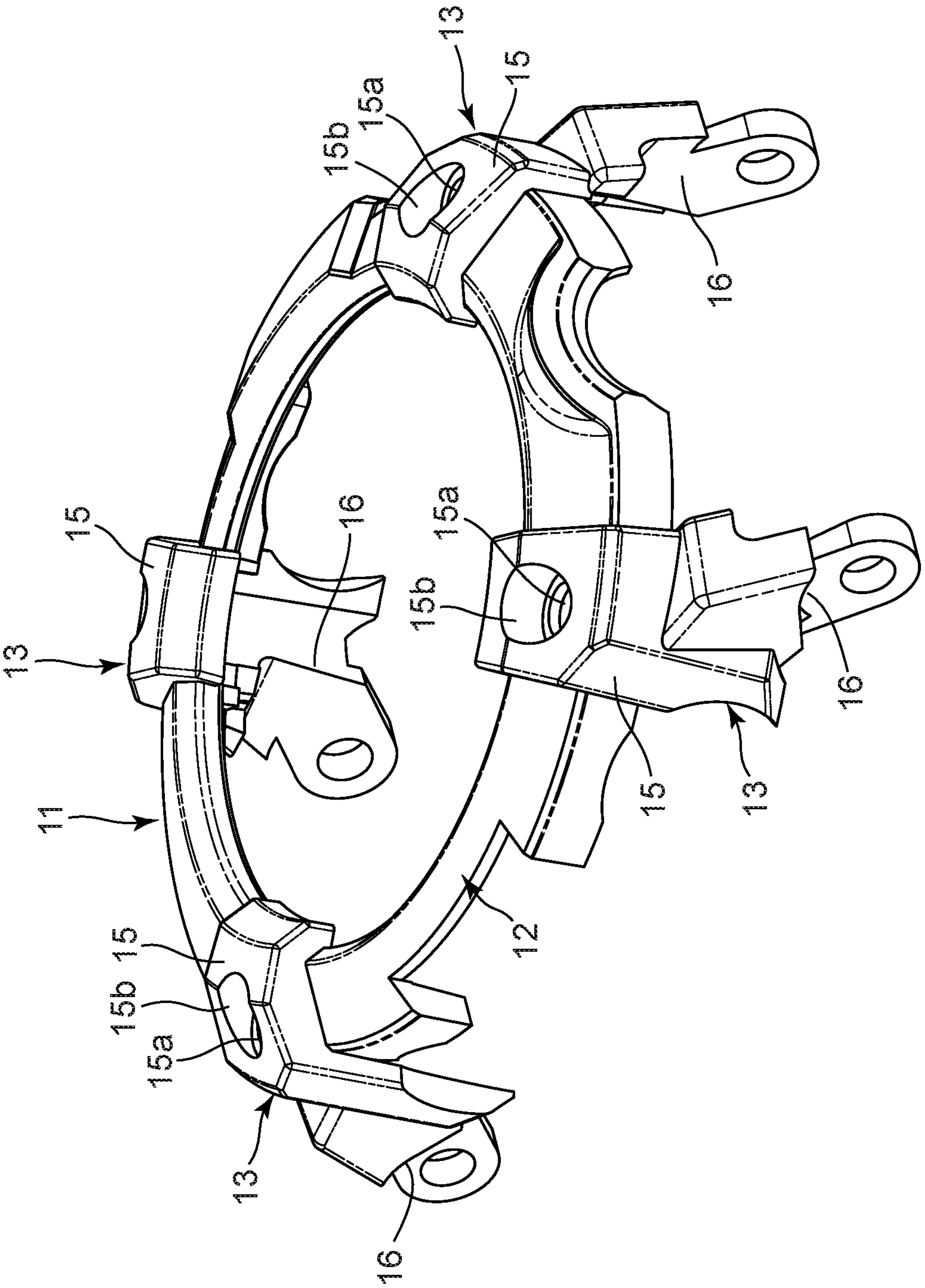
FIG. 3 is an enlarged perspective view of an exterior case of a wristwatch case shown in FIG. 1.

More specifically, in the present embodiment, each of the protection members 13 includes a main body section 15 which covers the corresponding cutout recess section 12*a* of the exterior main body section 12 and an area around the outer edge of the cutout recess section 12*a*, and a cover section 16 which covers the outer surface of the corresponding attachment projection section 3*a* of the case main body 10, as shown in FIG. 1 to FIG. 3. The cover section 16 and the main body section 15 herein are integrally formed.

In the main body section 15, an insertion hole 15*a* in which the screw section 14*a* of the corresponding screw member 14 is inserted is provided penetrating from the upper surface of the main body section 15 to the lower surface thereof, as shown in FIG. 2 and FIG. 3. In an area above this insertion hole 15*a*, a counterbore section 15*b* is provided in which the head section 14*b* of the screw member 14 is arranged. On the other hand, in the upper part of the case main body 10, screw holes 10*b* are provided into which the screw sections 14*a* of the screw members 14 are respectively screwed, and each screw hole 10*b* is coaxially positioned with respect to the insertion hole 15*a* of the corresponding main body section 15.

As a result, the exterior main body section 12 is arranged on the upper circumferential portion of the case main body 10, the main body sections 15 of the protection members 13 are arranged on the cutout recess sections 12*a* of the exterior main body section 12, and the cover sections 16 of the protection members 13 are arranged on the outer surfaces of the pairs of attachment projection sections 3*a* of the case main body 10, as shown in FIG. 2. In this state, the plurality of protection members 13 is attached to the case main body 10 by the screw members 14, and thereby fixes the exterior main body section 12 to the case main body 10.

That is, each protection member 13 is structured to be attached to the case main body 10 by the screw section 14*a* of the corresponding screw member 14 being screwed into the corresponding screw hole 10*b* of the case main body 10 through the insertion hole 15*a* in the main body section 15 of the protection member 13 on the exterior main body section 12 in the state where the insertion hole 15*a* has been coaxially positioned with the screw hole 10*b*, as shown in FIG. 2.

Also, when the screw section 14*a* of each screw member 14 is screwed into the corresponding screw hole 10*b* of the case main body 10 and tightened, the head section 14*b* of the screw member 14 is arranged in the counterbore section 15*b* of the corresponding main body section 15, as shown in FIG. 2. In addition, the main body sections 15 of the plurality of protection members 13 press the cutout recess sections 12*a* of the exterior main body section 12 against the case main body 10. As a result, the plurality of protection members 13 fixes the exterior main body section 12 to the case main body 10, and also reinforces the cutout recess sections 12*a* of the exterior main body section 12 so as to increase the impact strength.

Figure 4:
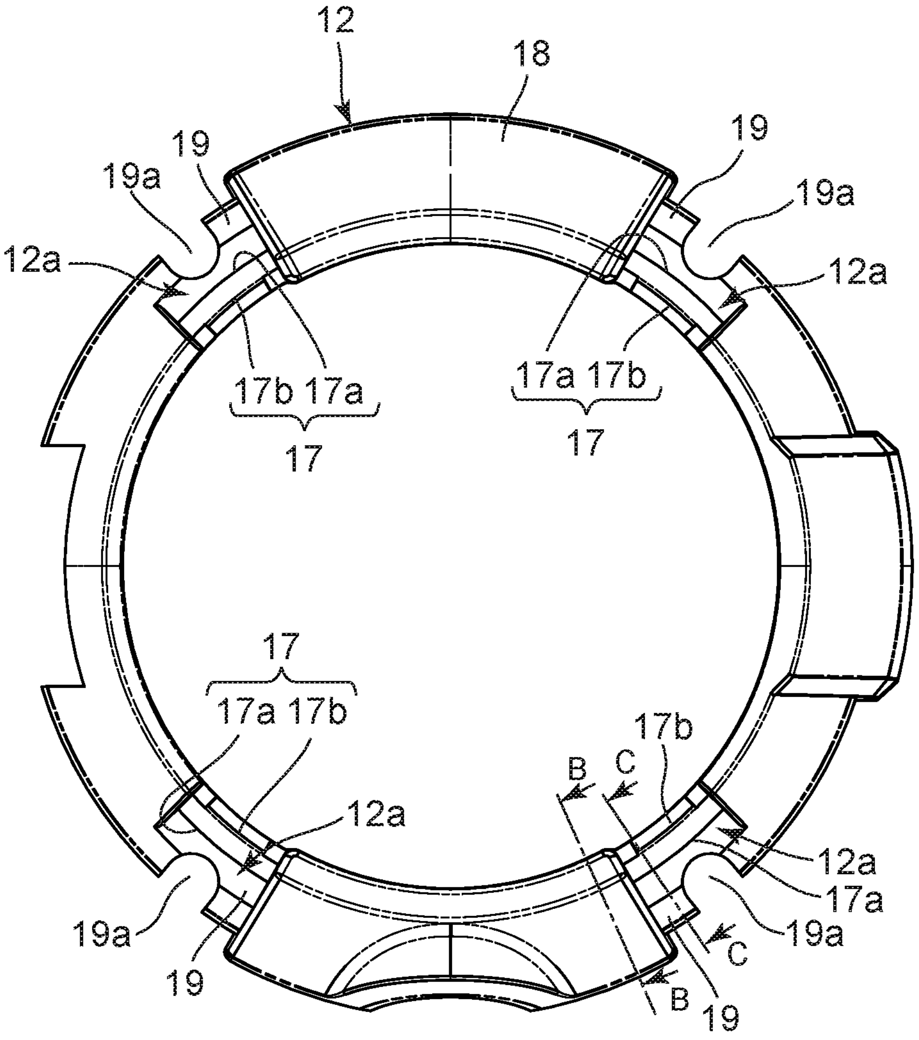
FIG. 4 is an enlarged front view of an exterior main body section of the exterior case shown in FIG. 3.
Figure 5A:
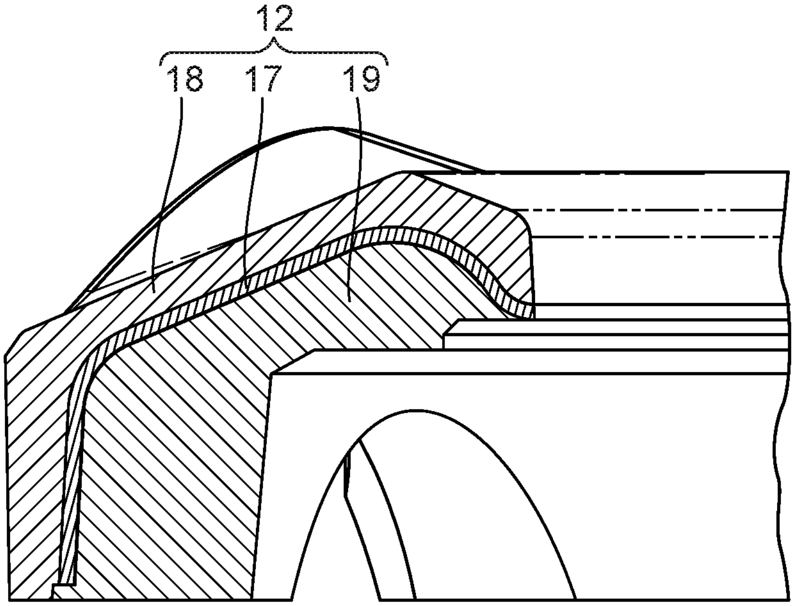
FIG. 5A is an enlarged perspective view of a cross-section of the main portion taken along line B-B in FIG. 4.
Figure 5B:
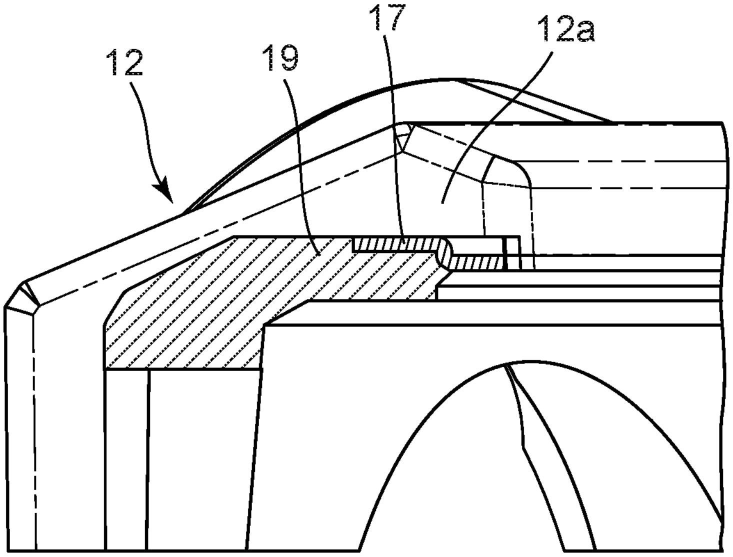
FIG. 5B is an enlarged perspective view of a cross-section of the main portion taken along line C-C in FIG. 4.

In the present embodiment, the exterior main body section 12 includes a carbon sheet 17 formed of carbon fiber, a first resin layer 18 provided on the upper surface of the carbon sheet 17 and having the cutout recess sections 12*a* from which the carbon sheet 17 is partially exposed, and a second resin layer 19 provided on the undersurface of the carbon sheet 17 opposite to the upper surface of carbon sheet 17, as shown in FIG. 4, FIG. 5A and FIG. 5B. Also, this exterior main body section 12 is formed in a substantially ring shape.

Figure 6A:
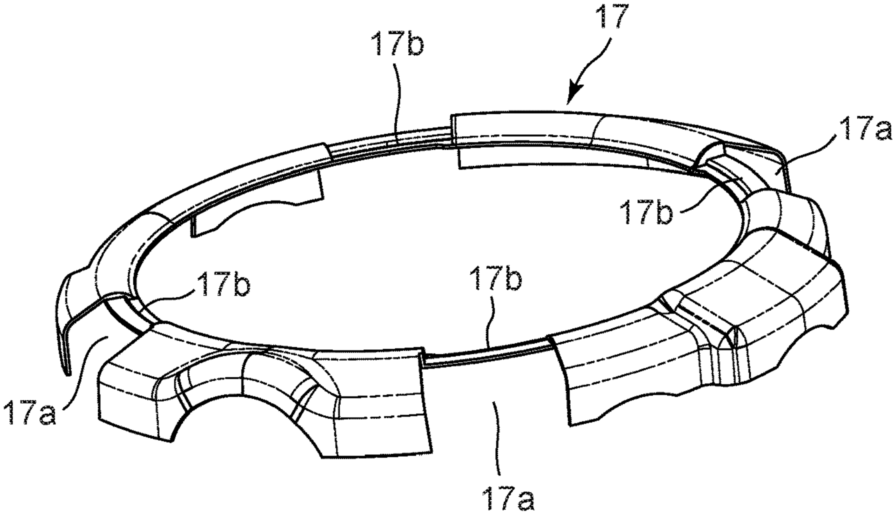
FIG. 6A is an enlarged perspective view of a carbon sheet of the exterior main body section shown in FIG. 4.
Figure 6B:
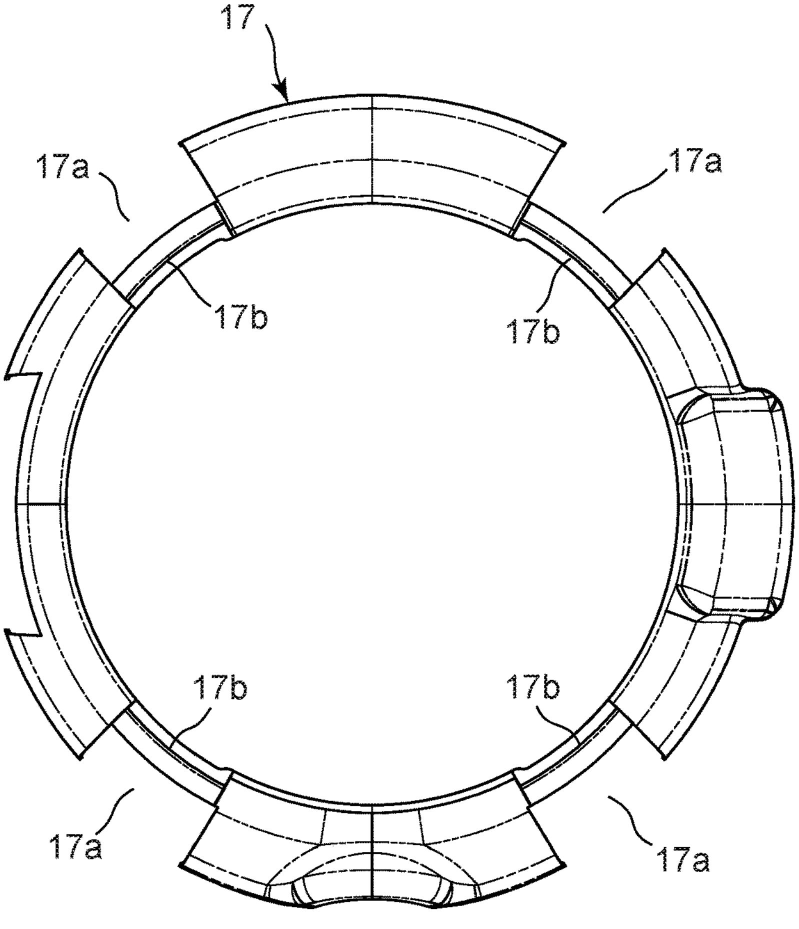
FIG. 6B is an enlarged front view of the carbon sheet of the exterior main body section shown in FIG. 4.

The carbon sheet 17 is formed by blanket-like shaped fibers being knitted out of carbon fiber and a plurality of knitting results acquired thereby being layered and coated with resin. This carbon sheet 17 covers the upper surface of the case main body 10 and the upper surface of the outer rim of the watch glass 5, and also covers the upper part of the outer circumference surface of the case main body 10. Also, this carbon sheet 17 has a ring shape and its cross-section has a substantially inverted V shape, as shown in FIG. 6A and FIG. 6B. Note that the cross-sectional shape of the carbon sheet is not limited thereto and may be a shape tailored to the shape of a case to be actually used.

In this carbon sheet 17, a plurality of cutout sections 17*a* and a plurality of connection sections 17*b* are provided at positions corresponding to the pairs of attachment projection sections 3*a* of the case main body 10, that is, positions corresponding to the plurality of cutout recess sections 12*a*, as shown in FIG. 6A and FIG. 6B. The plurality of cutout sections 17*a* is provided on the outer circumference side of the carbon sheet 17.

The plurality of connection sections 17*b* in the present embodiment is provided on the inner circumference side of the carbon sheet 17 while corresponding to the positions of the plurality of cutout sections 17*a*, as shown in FIG. 6A and FIG. 6B. Accordingly, by being connected by the plurality of connection sections 17*b*, the carbon sheet 17 is formed in a substantially ring shape as a whole even though the plurality of cutout sections 17*a* is provided therein.

The first resin layer 18 in the present embodiment is formed on the upper surface of the carbon sheet 17 by use of, for example, a synthetic resin acquired by polyamide resin being mixed with glass fiber or carbon fiber, as shown in FIG. 4 and FIG. 5A. In this first resin layer 18, the plurality of cutout recess sections 12*a* where the plurality of protection members 13 is arranged is provided corresponding to the plurality of cutout section 17*a* and plurality of connection sections 17*b* of the carbon sheet 17.

In the case of the present embodiment, the plurality of cutout recess sections 12*a* is provided extending from the outer circumference side of the carbon sheet 17 to the inner circumference side in areas corresponding to the plurality of cutout sections 17*a*, as shown in FIG. 4 to FIG. 5B. As a result, the plurality of cutout sections 17*a* provided on the outer circumference side of the carbon sheet 17 and the plurality of connection sections 17*b* provided on the inner circumference side of the carbon sheet 17 while corresponding to the plurality of cutout sections 17*a* are exposed.

The second resin layer 19 in the present embodiment is formed on the undersurface of the carbon sheet 17 opposite to the surface provided with the first resin layer 18 by use of, for example, a synthetic resin acquired by polyamide resin being mixed with glass fiber or carbon fiber, as shown in FIG. 4, FIG. 5A and FIG. 5B. That is, the second resin layer 19 is provided on the undersurface of the carbon sheet 17 and in areas corresponding to the plurality of cutout recess sections 12*a*, that is, areas corresponding to the plurality of cutout sections 17*a* and plurality of connection sections 17*b* of the carbon sheet 17.

As a result, when the main body sections 15 of the plurality of protection members 13 are arranged on the plurality of cutout recess sections 12*a* of the first resin layer 18, the undersurfaces of the main body sections 15 are pressed against upper surface portions of the second resin layer 19 corresponding to the plurality of cutout recess sections 12*a* and the upper surfaces of the plurality of connection sections 17*b* of the carbon sheet 17 exposed from the plurality of cutout recess sections 12*a*, as shown in FIG. 2.

By the main body sections 15 of the plurality of protection members 13 coming in pressure contact with the plurality of connection sections 17*b* of the carbon sheet 17 exposed from the plurality of cutout recess sections 12*a* when the main body sections 15 of the plurality of protection members 13 are arranged on the plurality of cutout recess sections 12*a* of the first resin layer 18, the plurality of connection sections 17*b* of the carbon sheet 17 are reinforced by the plurality of protection members 13.

In the case of the present embodiment, a plurality of insertion sections 19*a* into which the screw sections 14*a* of the plurality of screw members 14 are inserted is provided in portions of the second resin layer 19 corresponding to the plurality of cutout sections 17*a* of the carbon sheet 17, as shown in FIG. 4. These insertion sections 19*a* are cutout sections provided corresponding to outer circumference portions of the carbon sheet 17.

When the main body sections 15 of the plurality of protection members 13 are arranged on the plurality of cutout recess sections 12*a* of the first resin layer 18, these insertion sections 19*a* are coaxially positioned with the insertion holes 15*a* of the main body sections 15, respectively. In addition, when the exterior main body section 12 is arranged on the upper outer circumferential portion of the case main body 10, these insertion sections 19*a* are coaxially positioned with the screw holes 10*b* of the case main body 10, as shown in FIG. 4 and FIG. 5.

Next, a manufacturing method for manufacturing the exterior case 11 of this wristwatch is described with reference to FIG. 7A to FIG. 8B.

This manufacturing method for manufacturing the exterior case 11 includes a first step of fixing the carbon sheet 17 in a primary molding die 20 and forming the first resin layer 18 on the upper surface of the carbon sheet 17 so as to mold a primary molded article 21, a second step of arranging the primary molded article 21 in a secondary molding die 22 and forming the second resin layer 19 on the undersurface of the carbon sheet 17 so as to mold a secondary molded article which is the exterior main body section 12, and a third step of arranging the protection members 13 on the exterior main body section 12.

Figure 7A:
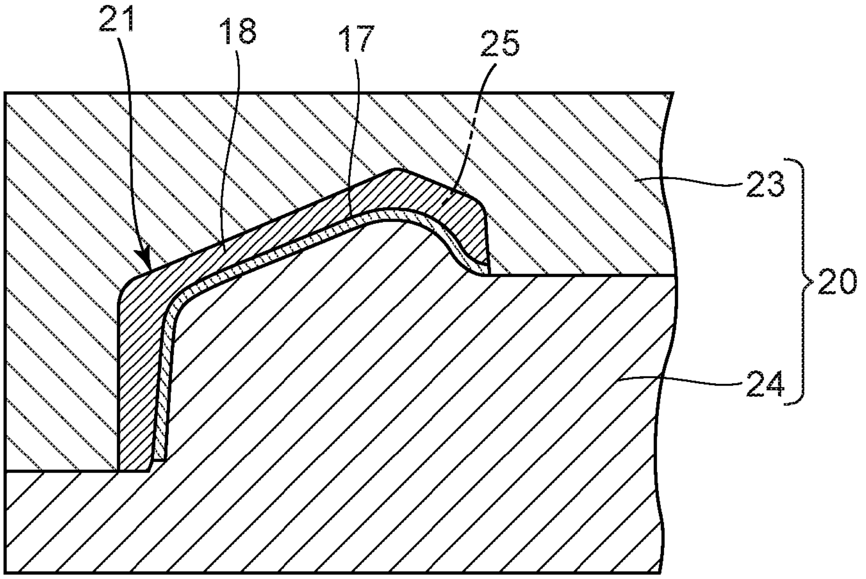
FIG. 7A is an enlarged sectional view of the main portion showing a molded state of a portion corresponding to FIG. 5A in first molding for the exterior case shown in FIG. 3.
Figure 7B:
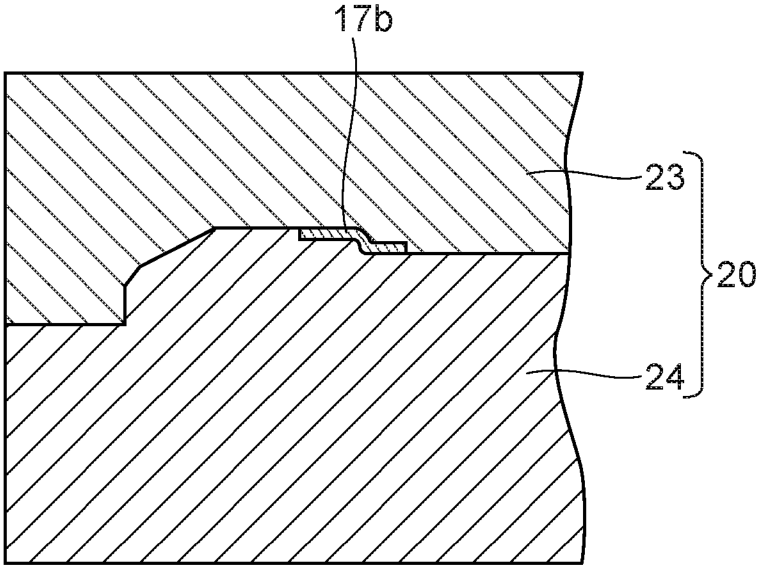
FIG. 7B is an enlarged sectional view of the main portion showing a molded state of a portion corresponding to FIG. 5B in the first molding for the exterior case shown in FIG. 3.

More specifically, at the first step, portions of the carbon sheet 17, that is, the plurality of connection sections 17*b* corresponding to the plurality of cutout sections 17*a* provided in the carbon sheet 17 are first held between portions of the primary molding die 20 so that the carbon sheet 17 is fixed in the primary molding die 20, as shown in FIG. 7A and FIG. 7B.

The primary molding die 20 includes an upper molding die 23 and a first lower molding die 24, as shown in FIG. 7A and FIG. 7B. The first lower molding die 24 is formed such that its inner surface has a substantially same shape as the undersurface of the carbon sheet 17 and portions of the inner surface are fitted into the plurality of cutout sections 17*a* in the carbon sheet 17 and pressed against the inner surface of the upper molding die 23.

Also, the first lower molding die 24 is formed such that the plurality of connection sections 17*b* of the carbon sheet 17 corresponding to the plurality of cutout sections 17*a* is pressed against the upper molding die 23 with the portions of the inner surface of the first lower molding die 24 being fitted into and arranged in the plurality of cutout sections 17*a* of the carbon sheet 17 and pressed against the inner surface of the upper molding die 23, as shown in FIG. 7A and FIG. 7B. The upper molding die 23 is formed such that portions of its inner surface presses the plurality of connection sections 17*b* of the carbon sheet 17 against the inner surface of the first lower molding die 24.

Accordingly, when the upper molding die 23 is arranged on and overlaps with the first lower molding die 24 with the carbon sheet 17 being arranged on the first lower molding die 24, the primary molding die 20 holds, between portions of the inner surface of the first lower molding die 24 and portions of the inner surface of the upper molding die 23, the plurality of connection sections 17*b* of the carbon sheet 17 corresponding to the plurality of cutout sections 17*a* with the portions of the inner surface of the first lower molding die 24 being fitted into and arranged in the plurality of cutout sections 17*a* of the carbon sheet 17 and being pressed against the inner surface of the upper molding die 23, as shown in FIG. 7A and FIG. 7B.

As a result, the plurality of connection sections 17*b* of the carbon sheet 17 is held between the portions of the inner surface of the upper molding die 23 and the portions of the inner surface of the first lower molding die 24, and the carbon sheet 17 is fixed in the primary molding die 20. Here, primary spaces 25 called cavities are formed between the upper surface of the carbon sheet 17 and the inner surface of the upper molding die 23 in the primary molding die 20 except for portions of the upper molding die 23 corresponding to the plurality of cutout sections 17*a* and the plurality of connection sections 17*b*, as shown in FIG. 7A and FIG. 7B.

In this state, resin is cast into each primary space 25 in the primary molding die 20 so as to form the first resin layer 18 on the upper surface of the carbon sheet 17. Here, since the resin does not flow into the portions of the upper molding die 23 corresponding to the plurality of cutout sections 17*a* and the plurality of connection sections 17*b*, the plurality of cutout recess sections 12*a* is formed in the first resin layer 18. Accordingly, the plurality of cutout sections 17*a* and plurality of connection sections 17*b* of the carbon sheet 17 correspond to the plurality of cutout recess sections 12*a* and are exposed upward. As a result, the primary molded article 21 is formed.

Figure 8A:
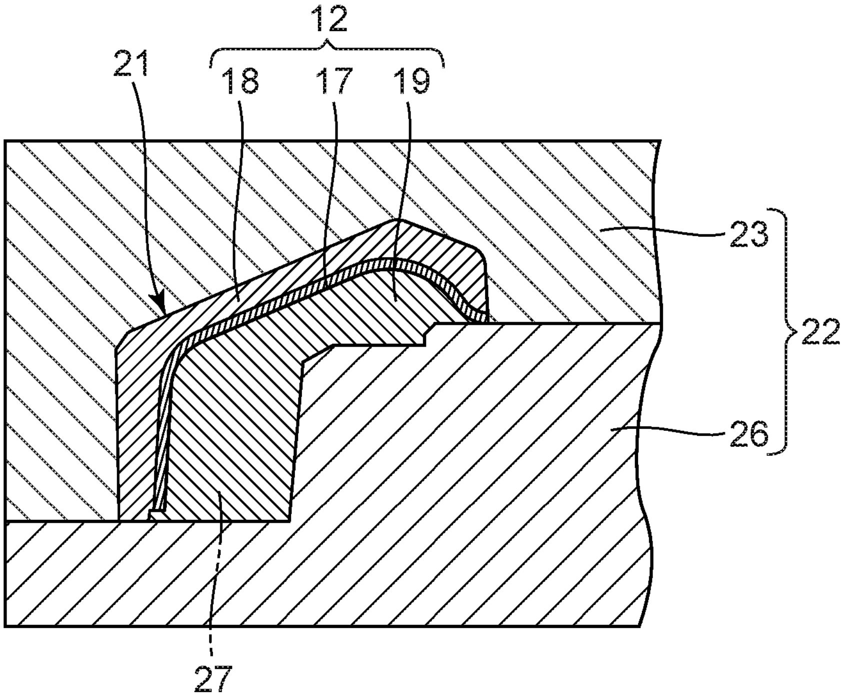
FIG. 8A is an enlarged sectional view of the main portion showing a molded state of the portion corresponding to FIG. 5A in second molding for the exterior case shown in FIG. 3.
Figure 8B:
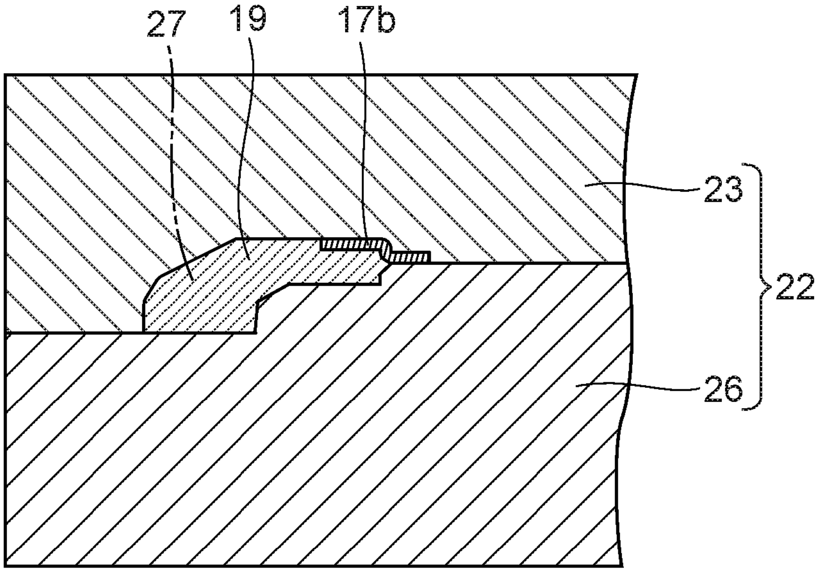
FIG. 8B is an enlarged sectional view of the main portion showing a molded state of the portion corresponding to FIG. 5B in the second molding for the exterior case shown in FIG. 3.

At the second step, the primary molded article 21 formed by the primary molding die 20 is arranged in a secondary molding die 22, and a second resin layer 19 is formed on the undersurface of the carbon sheet 17 so as to mold a secondary molded article which is the exterior main body section 12, as shown in FIG. 8A and FIG. 8B. The secondary molding die 22 includes the same upper molding die 23 as that constitutes the primary molding die 20, and a second lower molding die 26 whose shape is different from that of the first lower molding die 24 of the primary molding die 20. On the inner surface of the second lower molding die 26, a plurality of die cutting sections (not shown) for forming the insertion sections 19*a* at positions corresponding to the plurality of cutout sections 17*a* is provided.

Accordingly, when the upper molding die 23 and first lower molding die 24 of the primary molding die 20 are to be separated in the first step, the first lower molding die 24 is separated with the primary molded article 21 being remained in the upper molding die 23. In this state, the upper molding die 23 having the primary molded article 21 is arranged on and overlaps with the second lower molding die 26. Here, second spaces 27 called cavities are formed between the undersurface of the carbon sheet 17 of the primary molded article 21 and the inner surface of the second lower molding die 26 except for areas corresponding to the plurality of die cutting sections (not shown).

In this state, resin is cast into each second space 27 in the secondary molding die 22 so as to form the second resin layer 19 on the undersurface of the carbon sheet 17, whereby the exterior main body section 12 which is a secondary molded article is formed. Here, except for the areas corresponding to the plurality of die cutting sections (not shown), the second spaces 27 have been provided on portions of the inner surface of the upper molding die 23 corresponding to the plurality of cutout sections 17*a* of the carbon sheet 17 and on the undersurfaces of the plurality of connection sections 17*b* of the carbon sheet 17 that is being pressed by the inner surface of the upper molding die 23, and therefore the second resin layer 19 is formed at these positions as well.

As described above, the second resin layer 19 is formed on the entire area of the undersurface of the carbon sheet 17, that is, areas of the primary molded article 21 corresponding to the plurality of cutout sections 17*a*, and on the undersurfaces of the plurality of connection sections 17*b*. Here, by the plurality of die cutting sections (not shown) of the second lower molding die 26, the plurality of insertion sections 19*a* is formed in the portions of the second resin layer 19 corresponding to the plurality of cutout sections 17*a*. In addition, the inner circumference sides of the plurality of connection sections 17*b* are exposed from the first and second resin layers 18 and 19.

As a result, the exterior main body section 12 that is a secondary molded article in the present embodiment is acquired in which the first resin layer 18 has been formed on the upper surface of the carbon sheet 17, the plurality of cutout recess sections 12*a* from which the plurality of cutout sections 17*a* and plurality of connection sections 17*b* of the carbon sheet 17 are exposed has been formed in the four areas of the first resin layer 18, the second resin layer 19 has been formed on the undersurface of the carbon sheet 17, and the plurality of insertion sections 19*a* has been formed in the second resin layer 19 while corresponding to the plurality of cutout sections 17*a*, as shown in FIG. 4.

At the third step, the plurality of protection members 13 are arranged corresponding to the plurality of cutout recess sections 12*a* of the exterior main body section 12 which is the secondary molded article and the areas around the outer edges of the plurality of cutout recess sections 12*a*. That is, the main body sections 15 of the plurality of protection members 13 are arranged on the plurality of cutout recess sections 12*a* of the exterior main body section 12 and the areas around the outer edges of the plurality of cutout recess sections 12*a* so as to cover and protect the plurality of cutout sections 17*a* and plurality of connection sections 17*b* of the carbon sheet 17. Here, the cover sections 16 of the plurality of protection members 13 are arranged on the outer surfaces of the pairs of attachment projection sections 3*a* of the band attachment sections 3 provided on the case main body 10.

In the state where the plurality of protection members 13 have been arranged corresponding to the plurality of cutout recess sections 12*a* of the exterior main body section 12 and the areas around the outer edges of the plurality of cutout recess sections 12*a*, the insertion holes 15*a* provided in the main body sections 15 of the plurality of protection members 13 are coaxially positioned with the plurality of insertion sections 19*a* provided in the portions of the second resin layer 19 corresponding to the plurality of cutout recess sections 12*a* of the exterior main body section 12 and with the plurality of screw holes 10*b* provided in the case main body 10.

In this state, the plurality of protection members 13 is attached to the case main body 10 by the plurality of screw members 14. Here, the screw sections 14*a* of the plurality of screw members 14 are inserted from above into the insertion holes 15*a* in the main body sections 15 of the plurality of protection members 13, inserted into the plurality of insertion sections 19*a* in the second resin layer 19 of the exterior main body section 12, and then inserted into the plurality of screw holes 10*b* in the case main body 10.

When the screw sections 14*a* of the plurality of screw members 14 are screwed into the plurality of screw holes 10*b* of the case main body 10 and tighten, the head sections 14*b* of the plurality of screw members 14 are arranged in the counterbore sections 15*b* above the insertion holes 15*a* in the main body sections 15 of the plurality of protection members 13, and the main body sections 15 press the cutout recess sections 12*a* of the exterior main body section 12 against the case main body 10.

As a result, the exterior main body section 12 is fixed to the case main body 10 by the plurality of protection members 13, and the plurality of cutout recess sections 12*a* of the exterior main body section 12 is reinforced by the plurality of protection members 13. That is, by the plurality of protection members 13, the portions of the second resin layer 19 corresponding to the plurality of cutout sections 17*a* of the carbon sheet 17 and the plurality of connection sections 17*b* are protected and reinforced.

As such, the manufacturing method for manufacturing the exterior case 11 of the wristwatch includes the first step of holding the portions of the carbon sheet 17 formed of carbon fiber in the primary molding die 20 so as to fix the carbon sheet 17 and forming the first resin layer 18 on the upper surface of the carbon sheet 17 in this state so as to mold the primary molded article 21 where the cutout recess sections 12*a* from which the carbon sheet 17 is partially exposed have been provided on the first resin layer 18, the second step of arranging the primary molded article 21 in the secondary molding die 22 and forming the second resin layer 19 on the undersurface of the carbon sheet 17 so as to mold the secondary molded article which is the exterior main body section 12, and the third step of arranging the protection members 13 which partially cover and protect the carbon sheet 17 on the cutout recess sections 12*a* of the exterior main body section 12, whereby the exterior case 11 is favorably manufactured.

For example, in the case of the wristwatch case described in Japanese Patent Application Laid-Open (Kokai) Publication No. 07-244170, the exterior member should preferably be formed using a carbon sheet formed of carbon fiber for the purpose of strength enhancement and weight saving. In this case, when the exterior member is to be formed using the carbon sheet, resin layers are required to be formed on both the front and back sides of the carbon sheet because the carbon sheet alone is brittle.

However, in the case where resin layers are formed on both the front and back sides of the carbon sheet, when a first resin layer is to be formed on one side of the carbon sheet, the carbon sheet is likely to be turned over by resin cast into the molding die. Accordingly, there is a problem in that a primary molded article for manufacturing the exterior member is not favorably molded.

In contrast, in the manufacturing method for manufacturing the exterior case 11 in the present embodiment, the carbon sheet 17 is partially held between the above-described dies of the primary molding die 20 at the first step, so that the carbon sheet 17 is fixed. Accordingly, even when resin is cast into the primary molding die 20 so as to form the first resin layer 18 on the upper surface of the carbon sheet 17, the carbon sheet 17 is not turned over by this resin cast into the primary molding die 20.

That is, in this manufacturing method for manufacturing the exterior case 11, the first resin layer 18 is unfailingly and favorably formed on the upper surface of the carbon sheet 17 at the first step, and the second resin layer 19 is unfailingly and favorably formed on the undersurface of the carbon sheet 17 at the second step. Thus, the secondary molded article, which is the exterior main body section 12, is precisely and favorably molded.

Also, in this manufacturing method for manufacturing the exterior case 11, at the third step, the protection members 13 which partially cover and protect the carbon sheet 17 are arranged on the cutout recess sections 12*a* of the exterior main body section 12 which is the secondary molded article. Therefore, even though the exterior main body section 12 has the cutout recess sections 12*a*, these cutout recess sections 12*a* are reliably and favorably protected by the protection members 13. In addition, even if the exterior case 11 receives an external impact, this impact is buffered by the plurality of protection members 13, whereby the plurality of cutout recess sections 12*a* whose strength is low in comparison to the other parts of the exterior main body section 12 is prevented from being damaged.

Moreover, in this manufacturing method for manufacturing the exterior case 11, the carbon sheet 17 has a substantially ring shape and the portions of the carbon sheet 17 have the cutout sections 17*a* provided on the outer circumference side and the connection sections 17*b* provided on the inner circumference side which are held between the portions of the primary molding die 20. As a result, when the first resin layer 18 is to be formed on the upper surface of the carbon sheet 17 at the first step, the connection sections 17*b* of the carbon sheet 17 can be held between the portions of the primary molding die 20, so that the carbon sheet 17 can be reliably and favorably fixed.

That is, in this manufacturing method for manufacturing the exterior case 11, the primary molding die 20 includes the upper molding die 23 and the first lower molding die 24, and the plurality of connection sections 17*b* of the carbon sheet 17 corresponding to the plurality of cutout sections 17*a* is pressed against the inner surface of the upper molding die 23 with the inner surface of the first lower molding die 24 being fitted into and arranged in the plurality of cutout sections 17*a* provided in the carbon sheet 17 and pressed against the inner surface of the upper molding die 23. Therefore, even though the primary spaces 25 called cavities are provided between the upper surface of the carbon sheet 17 and the inner surface of the upper molding die 23 in the primary molding die 20, the carbon sheet 17 is reliably and favorably fixed in the primary molding die 20.

Furthermore, in this manufacturing method for manufacturing the exterior case 11, when the upper molding die 23 is arranged on and overlaps with the first lower molding die 24 of the primary molding die 20 with the carbon sheet 17 being arranged in the first lower molding die 24, the plurality of connection sections 17*b* of the carbon sheet 17 corresponding to the plurality of cutout sections 17*a* is held between the inner surface of the first lower molding die 24 and the inner surface of the upper molding die 23 with the inner surface of the first lower molding die 24 being fitted into and arranged in the plurality of cutout sections 17*a* of the carbon sheet 17 and pressed against the inner surface of the upper molding die 23. As a result of this structure, the carbon sheet 17 is reliably and favorably fixed in the primary molding die 20.

Still further, in this manufacturing method for manufacturing the exterior case 11, the primary molding die 20 and the secondary molding die 22 are respectively provided with the upper molding die 23 that is a first molding die. The primary molding die 20 has the first lower molding die 24 as a second molding die, and the secondary molding die 22 has the second lower molding die 26 as a second molding die. Since the upper molding die 23 which holds down the portions of the upper surface of the carbon sheet 17, that is, the upper surfaces of the connection sections 17*b* of the carbon sheet 17 is shared between the primary molding die 20 and the secondary molding die 22, the molding dies can be simplified and also the manufacturing process can be simplified.

That is, in this manufacturing method for manufacturing the exterior case 11, since the same upper molding die 23 can be used between the primary molding die 20 and the secondary molding die 22, the die making can be simplified. Also, when the primary molding die 20 is separated after the primary molded article 21 is molded at the first step, the upper molding die 23 of the primary molding die 20 is overlapped with the second lower molding die 26 of the secondary molding die 22 with the primary molded article 21 remaining in the upper molding die 23, whereby the exterior main body section 12 which is a secondary molded article is formed. That is, the manufacturing process can be simplified.

Yet still further, in this manufacturing method for manufacturing the exterior case 11, at the third step, the protection members 13 arranged on the cutout recess sections 12*a* of the exterior main body section 12 are attached to the case main body 10 by the screw members 14, whereby the exterior main body section 12 is fixed to the case main body 10. As a result, the connection sections 17*b* of the carbon sheet 17 exposed from the cutout recess sections 12*a* of the exterior main body section 12 are covered and protected by the protection members 13. In addition, the cutout recess sections 12*a* of the exterior main body section 12 are reinforced by the protection members 13. As a result, the cutout recess sections 12*a* are strengthened, so that these cutout recess sections 12*a* whose strength is low in comparison to the other parts of the exterior main body section 12 are prevented from being damaged.

Yet still further, in this manufacturing method for manufacturing the exterior case 11, each protection member 13 formed of a synthetic resin such as urethane resin includes the main body section 15 which covers the corresponding cutout recess section 12*a* of the exterior main body section 12 and an area around the outer edge of the cutout recess section 12*a*, and the cover section 16 which covers the outer surface of the corresponding attachment projection section 3*a* of the case main body 10. As a result, the main body section 15 of each protection member 13 is reliably fixed to the case main body 10 by the corresponding screw member 14 with the main body section 15 being arranged on the corresponding cutout recess section 12*a* of the exterior main body section 12 and an area around the outer edge of the cutout recess section 12*a* and the cover section 16 of the protection member 13 being arranged on the outer surface of the corresponding attachment projection section 3*a* of the corresponding band attachment section 3 of the case main body 10.

Yet still further, in this manufacturing method for manufacturing the exterior case 11, when the screw section 14*a* of each screw member 14 is inserted from above into the insertion hole 15*a* of the main body section 15 of the corresponding protection member 13, inserted into the corresponding insertion section 19*a* provided in the second resin layer 19 of the exterior main body section 12, and screwed into and fastened in the corresponding screw hole 10*b* of the case main body 10, the corresponding cutout recess section 12*a* of the exterior main body section 12 is unfailingly pressed against the case main body 10 by the main body section 15 with the head section 14*b* of the screw member 14 being arranged in the corresponding counterbore section 15*b* above the insertion hole 15*a* in the main body section 15 of the protection member 13.

As a result, in this manufacturing method for manufacturing the exterior case 11, the exterior main body section 12 is reliably and favorably fixed to the case main body 10 by the protection members 13, and the cutout recess sections 12*a* of the exterior main body section 12 are reliably reinforced by the protection members 13. That is, by the plurality of protection members 13, the portions of the second resin layer 19 corresponding to the cutout sections 17*a* of the carbon sheet 17 and the connection sections 17*b* in the cutout recess sections 12*a* are protected and reinforced, whereby the cutout recess sections 12*a* whose strength is low in comparison to the other parts of the exterior main body section 12 are prevented from being damaged.

Also, the exterior case 11 includes the exterior main body section 12 in which the first and second resin layers 18 and 19 have been provided on the front and back sides of the carbon sheet 17 formed of carbon fiber and the cutout recess sections 12*a* from which the portions of the carbon sheet 17 are exposed have been provided on the first resin layer 18 on the upper surface of the carbon sheet 17, and the protection members 13 arranged on the cutout recess sections 12*a* of the first resin layer 18 so as to cover and protect the portions of the carbon sheet 17. As a result of this structure, the exterior case 11 is reliably and favorably manufactured, and the cutout recess sections 12*a* of the exterior main body section 12 are favorably protected.

That is, in this exterior case 11, the exterior main body section 12 has the cutout recess sections 12*a* provided thereon, so that the exterior case 11 can be reliably and favorably manufactured. Also, even though the cutout recess sections 12*a* are provided on the exterior main body section 12, these cutout recess sections 12*a* can be protected by the protection members 13. Accordingly, even if the exterior case 11 receives an external impact, this impact is buffered by the protection members 13, whereby the cutout recess sections 12*a* whose strength is low in comparison to the other parts of the exterior main body section 12 are reliably prevented from being damaged.

In the case of the exterior case 11 in the present embodiment, the resin layers provided on the front and back sides of the carbon sheet 17 include the first resin layer 18 provided on the upper surface of the carbon sheet 17 and having the cutout recess sections 12*a* from which the carbon sheet 17 is partially exposed and the second resin layer 19 provided on the undersurface of the carbon sheet 17. As a result, both the front and back sides of the carbon sheet 17 are favorably protected by the first resin layer 18 and the second resin layer 19, so that the carbon sheet 17 is prevented from being damaged even though it is partially exposed and the exposed portions are brittle.

Moreover, in this exterior case 11, the carbon sheet 17 has a substantially ring shape and the portions of the carbon sheet 17 corresponding to the cutout recess sections 12*a* of the exterior main body section 12 have the cutout sections 17*a* provided on the outer circumference side and the connection sections 17*b* provided on the inner circumference side. As a result of this structure, even though the cutout sections 17*a* are provided on the portions of the carbon sheet 17 corresponding to the cutout recess sections 12*a* of the exterior main body section 12, the carbon sheet 17 can be formed in the substantially ring shape by being connected by the connection sections 17*b*.

Furthermore, in this exterior case 11, the protection members 13 are attached to the case main body 10 by the screw members 14, whereby the exterior main body section 12 is fixed to the case main body 10. As a result of this structure, by the protection members 13, the connection sections 17*b* of the carbon sheet 17 exposed from the cutout recess sections 12*a* of the exterior main body section 12 are protected, and the cutout recess sections 12*a* of the exterior main body section 12 are reinforced. That is, the cutout recess sections 12*a* whose strength is low in comparison to the other parts of the exterior main body section 12 are strengthen and reliably prevented from being damaged.

In the above-described embodiment, the exterior case 11 has a substantially ring shape, and accordingly the carbon sheet 17 also has a substantially ring shape. However, the shape of the carbon sheet 17 is not limited thereto, and it is only required that the carbon sheet has a shape conforming to the shape of the exterior case. In the case of another shape as well, when resin is to be cast into the molding dies, the carbon sheet is held between the molding dies so as not to be turned over, and the protection members which cover portions exposing the carbon sheet are provided after the casting of the resin. Also, the exterior case and the carbon sheet are not necessarily required to have similar shapes. For example, the shape of the carbon sheet may be changed as required in accordance with the shapes of portions of the exterior case that are required to be reinforced.

Also, in the above-described embodiment, the plurality of connection sections 17*b* of the carbon sheet 17 is provided on the inner circumference side of the carbon sheet 17. However, the present invention is not limited thereto. For example, the plurality of connection sections 17*b* may be provided on the outer circumference side of the carbon sheet 17.

Moreover, in the above-described embodiment, the plurality of protection members 13 is provided on the four portions of the exterior main body section 12. However, the number of protection members to be provided is not limited thereto. For example, the number thereof may be increased as required in a case where five or more portions for exposing the carbon sheet are provided at the time of manufacture. In addition, the positions of the protection members are also not limited to the above-described embodiment, and may be changed in accordance with positions where the carbon sheet is exposed. Moreover, although the plurality of protection members 13 includes the cover sections 16 in the above-described embodiment, the present invention is not limited thereto, and the plurality of protection members is only required to cover portions for exposing the carbon sheet.

Furthermore, in the above-described embodiment, the plurality of protection members 13 is fixed by the screw members 14. However, the fixing method is not limited thereto.

Still further, in the above-described embodiment, the wristwatch has been described. However, the embodiment is not necessarily required to be a wristwatch and may be various types of timepieces such as a travel watch, an alarm clock, a table clock, and a wall clock.

While the present invention has been described with reference to the preferred embodiments, it is intended that the invention be not limited by any of the details of the description therein but includes all the embodiments which fall within the scope of the appended claims.

What is claimed is:

1. A manufacturing method of an exterior member, comprising:

a step of fixing, in a molding die, a predetermined connection section of a sheet-like member, the connection section being provided while corresponding to a position of a predetermined cutout section, by holding the connection section between portions of the molding die and pressing an inner surface of the molding die against both front and back surfaces of the connection section of the sheet-like member; and a step of, after the step of fixing the connection section in the molding die, layering a resin layer on the sheet-like member such that at least one of surfaces of the connection section is exposed, while maintaining a state where the connection section is fixed in the molding die, wherein, by the step of layering the resin layer on the sheet-like member, a cutout recess section in which the sheet-like member is exposed from the resin layer is formed.

2. The manufacturing method of the exterior member according to claim 1, further comprising:

a step of a, after the step of layering the resin layer on the sheet-like member, layering a second resin layer on one of surfaces of at least the connection section of the sheet-like member.

3. The manufacturing method of the exterior member according to claim 2, further comprising:

a step of a, in the step of layering the resin layer on the sheet-like member, forming the resin layer on an other surface of the sheet-like member.

4. The manufacturing method of the exterior member according to claim 3, wherein, in the step of layering the second resin layer on the sheet-like member, the second resin layer is formed on the one of surfaces of a portion excluding the connection section of the sheet-like member.

5. The manufacturing method of the exterior member according to claim 1, wherein the cutout recess section in which the sheet-like member is exposed is provided on at least one surface of front and back of the sheet-like member.

6. The manufacturing method of the exterior member according to claim 1, wherein, after the step of layering the resin layer on the sheet-like member, a protection member is arranged so as to cover and protect a portion caused to be exposed in said step of the sheet-like member.

7. The manufacturing method of the exterior member according to claim 1, wherein the sheet-like member is a carbon sheet.

* * * * *